United States Patent [19]
Tilley

[11] Patent Number: 5,997,017
[45] Date of Patent: Dec. 7, 1999

[54] HUMAN-POWERED BUMPER CAR

[76] Inventor: Martin C. Tilley, 4775 N. 1115 East, Buhl, Id. 83316

[21] Appl. No.: 09/074,773

[22] Filed: May 7, 1998

[51] Int. Cl.⁶ .................................................. B62M 1/00
[52] U.S. Cl. ...................... 280/87.021; 293/127; 280/200
[58] Field of Search ......................... 280/87.051, 87.027, 280/274, 200; 293/127; 297/5

[56] References Cited

U.S. PATENT DOCUMENTS

| | | | |
|---|---|---|---|
| 75,274 | 3/1868 | Hurd | 280/87.051 |
| D. 250,550 | 12/1978 | Reverchon | D34/5 L |
| D. 267,185 | 12/1982 | Reverchon | D21/250 |
| 3,820,790 | 6/1974 | Peterson | 293/127 |
| 4,019,756 | 4/1977 | Ishida | 280/649 |
| 4,190,129 | 2/1980 | Mary | 180/119 |
| 4,324,301 | 4/1982 | Eyerly | 180/2 R |
| 4,359,242 | 11/1982 | Gerken et al. | 297/5 |
| 4,699,392 | 10/1987 | Ku | 280/87.02 W |
| 4,988,138 | 1/1991 | Danna et al. | 293/127 |
| 5,324,064 | 6/1994 | Sumser et al. | 293/127 |
| 5,516,169 | 5/1996 | Falk et al. | 293/127 |

*Primary Examiner*—Lanna Mai
*Assistant Examiner*—Andrew J. Fischer
*Attorney, Agent, or Firm*—Ken J. Pedersen; Barbara S. Pedersen

[57] ABSTRACT

Embodiments of a human-powered bumper car are shown and described, each embodiment allowing the occupant of the car to power the car's movement on a surface with his/her feet. Preferably, no motor, fuel, electricity, or pedal mechanism are needed, and no moving parts are needed except for the wheel assemblies and a seat belt. The bottom of the car has an opening which allows the occupant's feet to reach through the car to the ground. The bumper of the car encircles the car and is typically raised up slightly above the elevation of the driver's seat. The resulting distribution of mass of the car and its occupant results in a safe and fun bumper car that is not prone to leaving its stable, horizontal orientation.

10 Claims, 3 Drawing Sheets

HUMAN-POWERED BUMPER CAR

BACKGROUND OF THE INVENTION

1. Field of the Invention

This invention relates, in general, to amusement vehicles such as bumper cars. More specifically, this invention relates to a bumper car which is human-powered and which is adapted for stable, not-tipping performance upon impact with other bumper cars and surfaces. The invented design provides a stable and safe bumper car, maneuverable by the driver's feet.

2. Related Art

One and two-person bumper cars have been designed for carnivals and other amusement centers. Many of the bumper cars seen at carnivals operate on an electrically-conductive floor underneath an electrically-conductive ceiling, by means of an electric motor and drive wheels. Other bumper cars are gas-powered, with combustion-engine-powered wheels or tracks. A popular design is to include a blower that creates an air "cushion" underneath the car, in order to give a feeling of floating and to reduce the frictional resistance to movement of the car. The conventional bumper car, therefore, is a motorized vehicle, with the driver typically steering the vehicle by means of a hand-operated steering wheel and accelerating the vehicle by means of a motorcycle-style hand-grip or an automobile-style foot-pedal. The occupant(s) of conventional bumper cars sit inside the car without contacting anything outside the car, and, especially, without contacting the floor or other surface upon which the car operates.

Conventional bumper cars feature a bumper that is low-to-the-ground, and a chair that is high up above the bumper. Typically, the bumper is about a 2–6 inch thick rubber pad surrounding the base of the car, that is, the structure that rests on or within an inch or two of the floor or ground. The chair or other seating for the occupant(s) typically sits well above the padded base of the car, to leave room between the occupant and the base of the car for the motor and other drive equipment. Thus, the horizontal seat is typically 1½–3 feet above the bottom of the car, and leaving room for the occupant'(s) legs and feet above a passenger compartment floor, and leaving room under the compartment floor to house the motor and drive equipment. Therefore, many conventional bumper cars have a structure that may be likened to a chair or car sitting on top of a thick pad or cushion or on top of a thick padded platform. See, for example, Eyerly (U.S. Pat. No. 4,324,301, issued Apr. 13, 1982) and Reverchon (U.S. Pat. No. Design 250,550 and Design Pat. No. 267,185). Eyerly shows a low-to-the-floor bumper supporting a high-sitting chair. Reverchon discloses bumper car designs reminiscent of personal water-craft or snowmobile bodies sitting on top of pads. Therefore, it may be said that conventional bumper cars are designed for motor-driven movement along a flat surface, with the driver steering and accelerating generally conventional vehicle controls from a seat atop the car.

Alternative styles of bumpers may be viewed in patent literature relating to infant walkers, which hold a child above the ground and protect the woodwork and walls from marring and chipping. See, for example, Danna (U.S. Pat. No. 4,988,138), Ishida (U.S. Pat. No. 4,019,756), Ku (U.S. Pat. No. 4,699,392), and Gerken (U.S. Pat. No. 4,359,242). These baby walkers feature a sling-seat for suspending the baby high in the walker, to approximate the baby standing and walking on its own. The bumpers of these walkers is only about 1–3 inches above the floor, in order to safely bump into baseboards and door jambs.

Other infant/toddler devices feature foot-powered loco-motion. For example, some toddler "cars" feature an open bottom through which the child extends his/her feet to push the car around on the floor. One example is the Super Car™, made by Today's Kids of the U.S.A. Such toys are molded plastic, automobile-shaped bodies without any significant bumper structure. Because these toys are designed to go generally straight forward or straight backward, the wheels of these cars include at least two wheels which only rotate on their axles, but do not swivel in castor-style.

What is still needed is an amusing bumper car for adults and teenagers. What is needed is a bumper car that is allows the driver to be more in-control of the car and to feel more like a player or combatant in a game, rather than a relatively passive rider on a carnival ride. What is still needed is a safe and enviromnentally-friendly bumper car that may be operated in many venues, such as mall parking lots, charity and school festivals, and small-business environments, without fear of accidents during set-up or operation.

SUMMARY OF THE INVENTION

The present invention comprises a human-powered bumper car with an open bottom, which allows the occupant to move the car with his/her own feet and to steer the car with his/her own feet and body movement. This invention features a frame to which a chair, a bumper, and wheels are connected. The open bottom of the bumper car receives the legs of the occupant, so that his/her feet touch the ground to push and pull the bumper car around on the ground, preferably impacting other similar, occupied bumper cars for games and amusement.

The car's frame and bumper are preferably broad and generally horizontal, that is, wider than tall, to create a wide wheel base that is not prone to tipping either during travel across the ground/floor, maneuvering and changing direction, or during impact. The car frame and bumper preferably are generally, but not necessarily exactly, symmetrical around the vertical central axis of the frame. The wheels and seat are preferably attached to the rear half of the car, so that the occupant sits in the rear half of the car and his/her legs and feet extend through the front half of the car. Therefore, the occupied car is not necessarily perfectly symmetrical around the central axis of the frame, but the preferred car, with its low-sitting occupant, still tends to be stable on the wide wheel base.

The invented bumper car is preferably adapted to have a mass distribution and positioning of the occupant(s) relative to the car that optimize the bumper car performance, especially in response to inpact. The bumper is preferably generally symmetrical above and below its own horizontal center plane. The mass of the seat back in the upper area of the car tends to be offset by the mass of the wheel system in the lower area of the car. The preferred horizontal seat is in the general area of the center horizontal plane of the bumper, and is preferably below the center plane of the bumper by about 6–10 inches, in order to place the low sitting occupant with his/her own center of gravity at or near the bumper horizontal center plane. Thus, with the occupant in place, the mass of the car-plus-occupant system is centered at or near the bumper horizontal center plane, with said plane's outer extremity preferably being the point of impact for the bumper car against another car, wall, or barricade. The result, therefore, of the preferred mass distribution is that the car does not tend to tip up or down upon impact, and the bumper does not tend to slide up or down the wall or other impacted surface. When the bumper car hits another car or surface in a lateral direction, it hits and rebounds in the lateral (horizontal) direction, that is, parallel to the bumper center plane, rather than "climbing" up on top of another bumper or up a wall surface and rather than "dipping" down below another bumper or down the wall.

DESCRIPTION OF THE PREFERRED EMBODIMENTS

Figure 1:
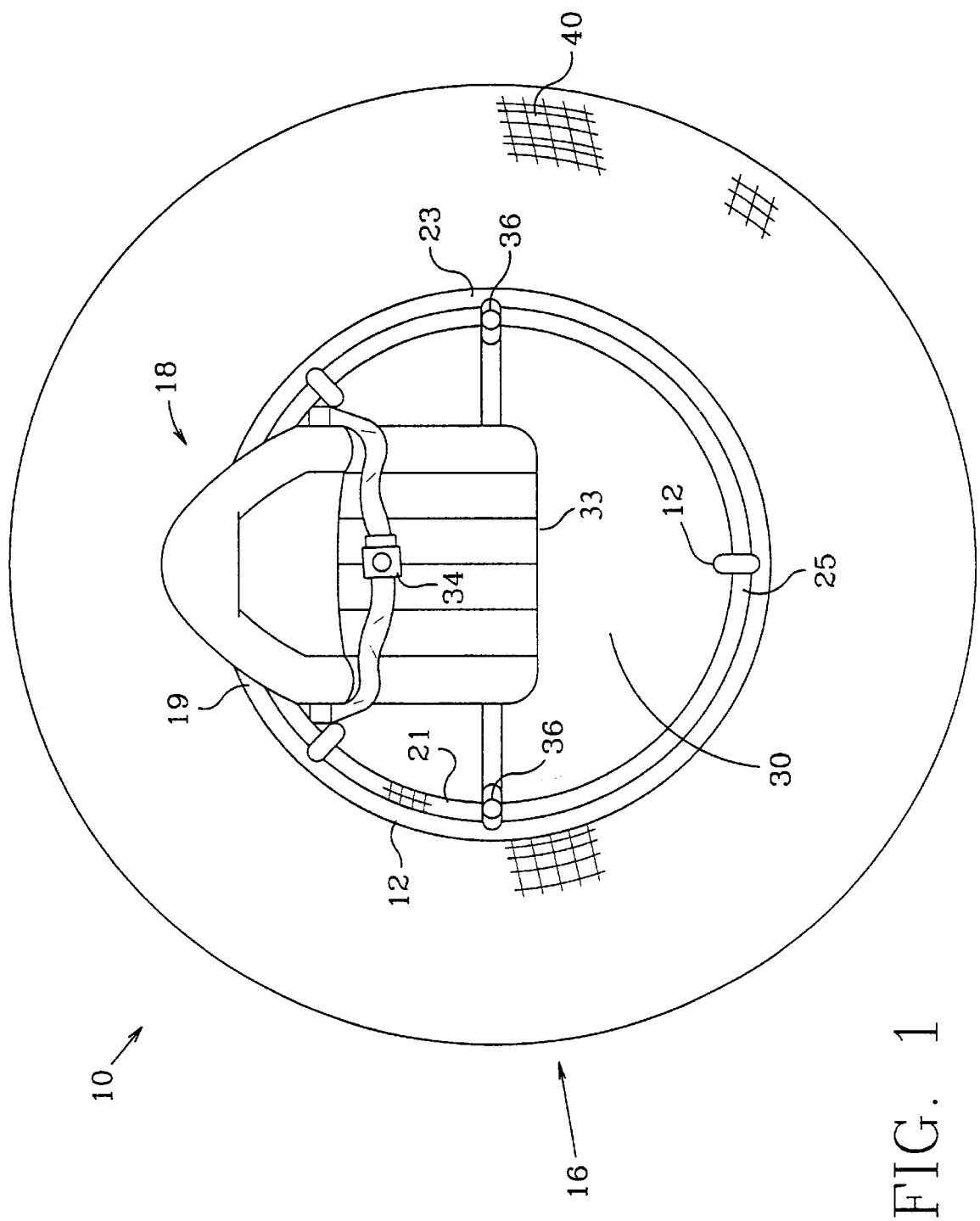
FIG. 1 is a top view of one embodiment of the invention.
Figure 2:
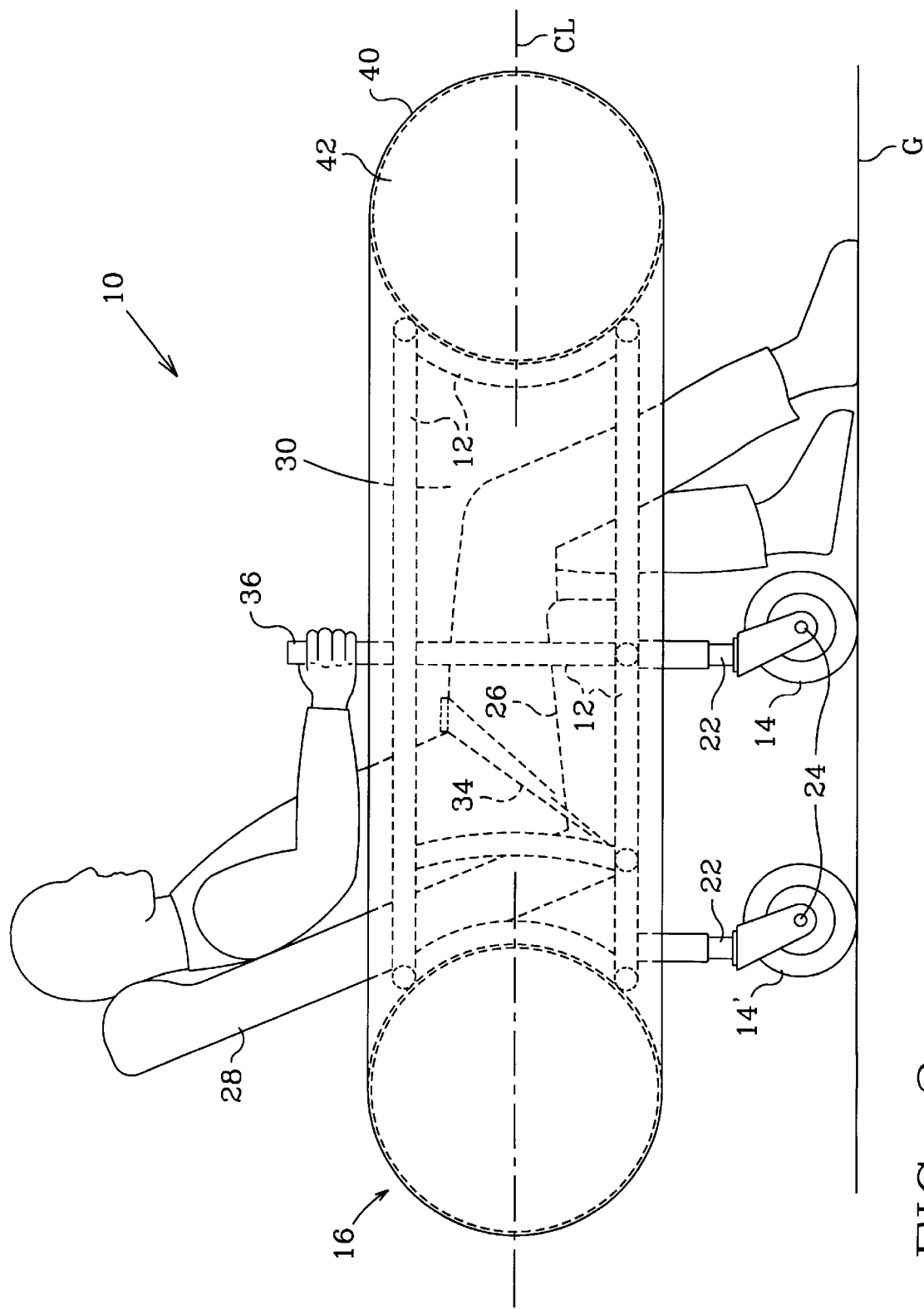
FIG. 2 is a side view of the embodiment of FIG. 1.
Figure 3:
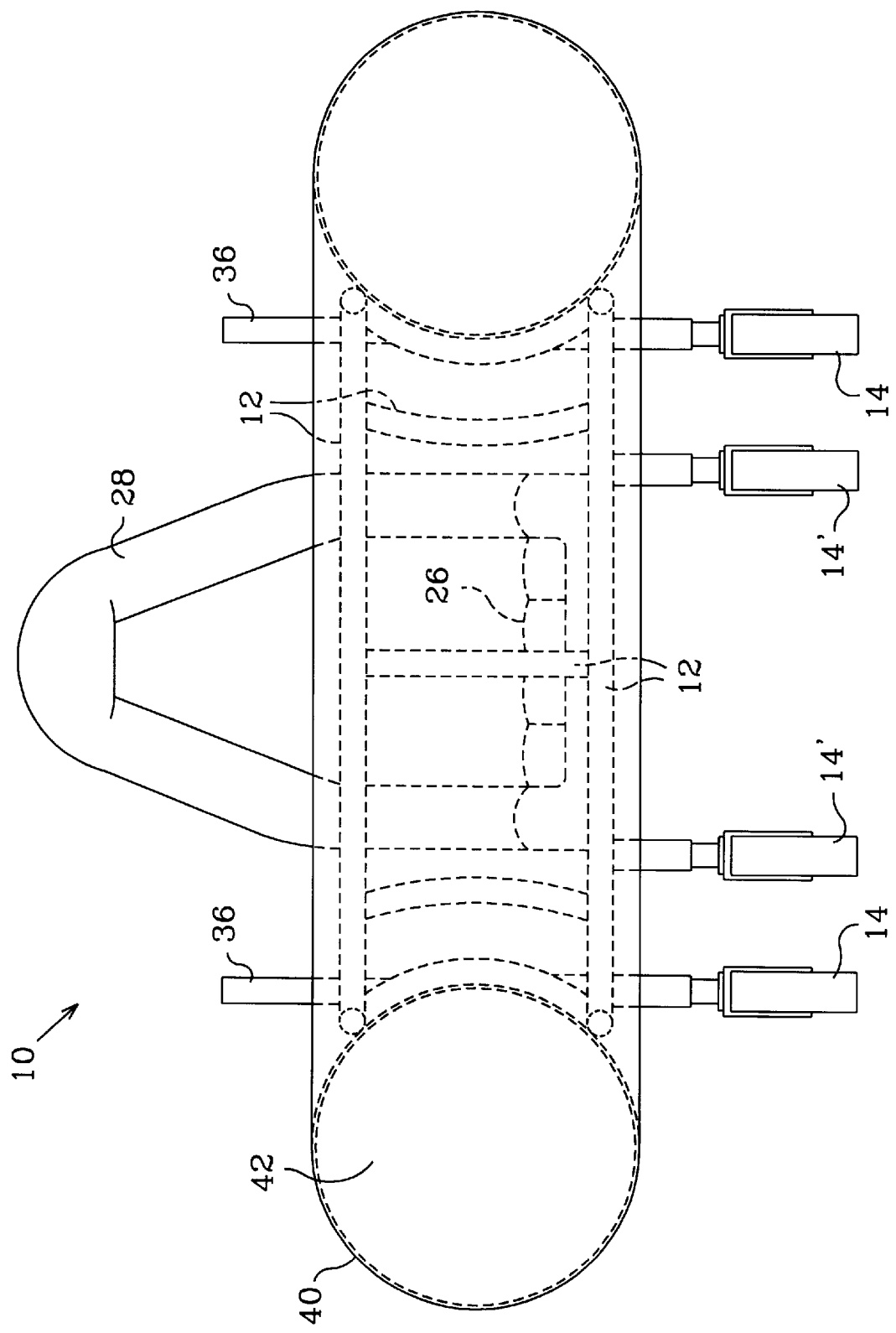
FIG. 3 is a front view of the embodiment of FIGS. 1 and 2.

Referring to the figures, there is shown one, but not the only, embodiment of the invented human-powered bumper car 10. The car 10 comprises a frame 12 with wheels 14, a wide bumper 16 connected to the frame, and a chair 18 or other occupant seating. The preferred car 10 does not have a motor or any other mechanized source of power, electrical, gas, or otherwise. The preferred car 10 has no pedal-operated power source, that is, no bicycle-style mechanism powered by the occupant's feet. Preferably, the only source of power for the car 10 is the frictional engagement and force applied by the occupant to the ground surface (G) on which the car 10 rolls, and force applied by impacts with other bumper cars or wall or barricade surfaces. The occupant preferably controls movement of the car by pushing and pulling with his feet against the concrete or other ground surface.

The frame 12 may be various strong, preferably light-weight structures, with various percentages of open area. One possible frame 12 may be made of strong metal tubing formed into a generally cylindrical but quite open structure. Alternatively, a metal sheet may be formed into a generally cylindrical frame open at the top and bottom.

The frame 12 has structure for the attachment of a plurality of wheels 14. Preferably, the wheels 14 are all caster-style wheels, each being adapted to swivel around the vertical axis of its connector 22 and to rotate around its horizontal axle 24. Four wheels, connected to the frame spaced apart near the bottom horizontal extent of the frame, are preferred. Approximately 4–8 inch diameter wheels are preferred, but many other wheel sizes may be used. These wheels provide a wide wheel base for stable operation, in that they are spaced apart on the broad frame. However, the wheels are preferably located on only about the back half of the frame, that is, the half of the frame (180°) beside and behind the driver's seat. Preferably, two wheels (14) are at or near the horizontal, transverse mid-line of the frame, that is, at about 170–190° from each other. Preferably, two other wheels (14') are generally behind and beneath the driver's seat, at about 50–65° from each other and from the first two wheels. Thus, those four wheels provide a stable, maneuverable wheel base, while leaving most of the area underneath the front half of the frame without wheels or other downward vertical protrusions. This wheel arrangement allows the driver's feet to extend, move, and push against the ground underneath approximately the front half of the bumper car. Thus, a total of at least ½ of the open bottom of the frame is available for foot movement to propel and direct the bumper car.

The preferred positioning of the wheels under the rear ½ of the frame adds to the safety of the invented bumper car. With the wheels so-located, the wheels are less likely to impact or run across the occupant's feet and ankles. Optionally, wheel guards or a shield may be added to protect the occupant from the wheels.

The frame 12 has structure for the attachment of the chair 18. The chair 18 preferably comprises a seat 26 and a back 28 rigidly and immovably secured to the frame 12 near the rear side 19 of the frame so that the chair 18 is in the rear half of the car. By "immovably" is meant that the chair 18 preferably does not move relative to the frame and the other structure of the car. The "driver" of the car, in effect, braces himself in the chair and pushes against the ground, transmitting force to the chair and, hence, to the frame and the entire car, to move and maneuver the car. Movement of the chair 18 relative to the frame would, in most cases, interfere with controllability and acceleration of the car. The chair 18 is positioned in generally the back one-half of the preferred circular, frame opening 30, leaving the other front half of the opening 30 (near front side 25 and extending from the front side 25 to the seat front edge 33, as shown in FIG. 1) free to receive the downwardly-extending legs of the occupant so that the occupant's feet easily touch the ground.

Alternative seating styles or occupant-receiving means may be used, but the sports-car-type seat is preferred for comfortable support of the occupant and easy entry and exit. In the sports-car-seat, the occupant tends to sit fairly low, with his/her knees even slightly above his/her hips. The sports-car-seat is also preferred because of safety issues, in that it tends to control the location of the occupant to a great degree and prevent the occupant from falling against or under the car or its wheels. A sling-style seat is less preferable, as such seats are uncomfortable for adults, teenagers and kids and difficult to climb into and out of. A bench or two opposing seats with seat belts may be used, especially with a plurality of occupants. Alternatively, other occupant-receiving means besides seating may be used to hold the occupant in the bumper car or hold the bumper car around the occupant. For example, the occupant may even be in a generally upright, walking position, with the occupant-receiving means being a sling, a harness, strap, back support, chest support, upper arm support, or combination thereof.

Several features are preferably included to enhance safety and to enhance the driver's ability to "brace" himself inside the car and move the car 10 relative to the ground. A seat belt 34 secures the driver in the seat during impacts, and gives the occupant more leverage against the ground by preventing him/her from significant sliding on the seat. A high seat back 28 increases safety for the driver's back and neck and allows the driver to push backwards with a great deal of force. Two hand-grips 36 are preferably included on or near the upper extent of the frame, on the right 21 and left sides 23 approximately 180° apart. These hand-grips 36 let the driver position and brace himself inside the car, increasing safety and the power and speed with which he can move the car.

The bumper 16 is connected to the outside of the frame to be generally horizontal and to completely surround the chair and occupant on all sides, that is, front, back and left and right. The bumper 16 preferably comprises a very tough, resilient, inflated member that will provide a great deal of "bounce" when one car impacts another. The preferred bumper 16 comprises an inflated inner-tube 40 inside a canvas shell or casing 42. A tractor tire inner-tube 40, having approximately a 58" outer diameter and a 38" inner diameter serves well for this bumper. Canvas casing 42 is zipped, stitched, or otherwise held around the inner-tube and is attached to the frame by means of nylon web-strapping and Velcro® or other fasteners. Alternatively, other bumpers may be attached to the bumper car frame such as a dense foam bumper, or other resilient material.

The preferred, round, "doughnut" or slightly oval bumper shape creates a bumper car 10 that is about three times (preferably in the range of 2-½ to 3-½ times) as wide as it is high, when height is measured from the bottom of the wheels to the top of the bumper. The preferred car 10 is approximately 6 feet across (outer diameter) and is approximately 14" high from the bottom of the wheels to the bottom of the bumper, and about 26" from the bottom of the wheels to the top of the bumper. The wheels are spaced widely apart near the outer perimeter of the frame. The preferred car 10 is therefore wide and relatively low to the ground, which, combined with the mass distribution and location discussed below, contributes to a stable, non-tipping system.

The horizontal seat of the chair 18 is preferably about 6–10" below the horizontal center line (CL) of the bumper. A typical, single occupant of the car, therefore, sits low in the car and his/her resulting center of gravity, which is typically at or slightly above the hips, is generally at or near the horizontal center plane of the bumper.

Therefore, as discussed in the "Summary Section", the preferred broad, low profile and the relative location of bumper, frame, wheels, and seating, result in a mass distribution and center of gravity for the occupied car that are preferably, but not necessarily, at or near the bumper horizontal center plane, that is, the horizontal plane passing through the bumper midway between the top-most surface of the bumper and the bottom-most surface of the bumper. By "at or near" is meant 8–10 inches or less either above or below the center plane. More preferably, the center of gravity is as close as possible to the center plane, for example, within about 2 inches above or below the center plane. In summary, the non-tipping maneuverability and the "non-climbing", "non-dipping" impact performance of the invented car, when occupied, are enhanced by several related factors: a) the preferred vertical mass distribution (above and below the center plane of the bumper) is centered at/near the horizontal center plane of the bumper; b) the preferred lateral mass distribution (that is, mass location relative to right and left side and front and back of the car) is centered over the wheels; c) the preferred bumper is generally symmetrical around the vertical central axis of the frame; and d) in the case of a single occupant car, the occupant is preferably positioned in the rear half of the car, preferably generally midway between the right and left sides of the car and over the center of the wheel base.

Alternative bumper styles may be used, with the frame adapted to properly support the bumper. Preferably, the bumper is wider than tall, and generally symmetrical around its vertical axis and above and below its horizontal center plane, but these criteria are not necessarily required as long as the car is safe and the occupant can adequately maneuver the car. For example, a tall cylindrical bumper may be used, especially if the occupant is in a more upright position. Other bumper shapes besides round may be used, for example, bumpers having outer perimeters that are oval, rectangular, and even irregularly-shaped, however, such shapes may add to the difficulty for the occupant of predicting the bumper car's performance.

Alternatively, bumper cars may be made according to this invention that have more than one seat for more than one occupant. Preferably, the plurality of seats or a multi-occupant bench are all contained within the interior of the frame with enough foot room open to the ground for all occupants to propel and direct the bumper car. In the case of bumper cars with two opposing seats, the first and second occupants would preferably be seated in the front half and rear half of the car, respectively, generally facing each other. In such embodiments, the bumper car frame would be substantially open at the bottom, and the wheels would be located only under the front side and back side of the frame, rather than under the right and left sides, so that both occupants' feet could reach and maneuver on the ground without injury. The two opposing seats and occupants could be exactly facing each other, or could be facing but offset (one slightly to the right and one slightly to the left) so that the legs of the occupants would be generally parallel but would extend past each other to help keep the legs from hitting and interfering with each other.

Although this invention has been described above with reference to particular means, materials and embodiments, it is to be understood that the invention is not limited to these disclosed particulars, but extends instead to all equivalents within the scope of the following claims.

I claim:

1. A human-powered bumper car for receiving an occupant, the bumper car comprising:

a frame having a top, a bottom, a front half, a back half, a front side, and right and left sides, and an interior;

a generally-horizontal seat received within the interior of the frame in the back half of the frame, the seat having a front edge;

a plurality of wheels, each connected to the frame by a connector with a vertical axis and adapted to touch a ground surface, wherein:

all of the wheels are caster wheels located behind and below the back half of the frame and below the frame, each wheel having a horizontal axle, wherein each wheel freely swivels below the frame around the vertical axis, and each wheel freely rotates on its horizontal axle; and a resilient bumper connected to and extending horizontally around the frame and having a horizontal center plane;

wherein the frame horizontally surrounds the seat and has an open bottom;

wherein the seat is for receiving an occupant and the frame open bottom is adapted to receive the occupant's legs so that the occupant's feet touch the ground surface; and wherein the occupied bumper car is adapted to have a center of gravity that is near the horizontal center plane of the bumper.

2. A human-powered bumper car as in claim 1, wherein the seat is below the center plane.

3. A human-powered bumper car as in claim 1, wherein the seat is 6–10 inches below the center plane.

4. A human-powered bumper car as in claim 1, comprising no motor and the bumper car comprising a means for powering the bumper car that consists only of the frame open bottom being adapted to allow a occupant's legs to move within said open bottom from the seat front edge to the front side and from the left side to the right side while occupant's feet touch the ground surface and push and pull the bumper car on the ground surface.

5. A human-powered bumper car as in claim 1, comprising no foot-pedal means.

6. A human-powered bumper car as in claim 1, wherein the bumper is circular.

7. A human-powered bumper car as in claim 1, wherein the bumper comprises an inflated inner-tube and a casing surrounding the inner-tube.

8. A human-powered bumper car as in claim 1, wherein the car has a width that is 2.5–3.5 times wider than the height of the car up from bottom of the wheels to top of the bumper.

9. A human-powered bumper car as in claim 1, wherein the bumper-car center of gravity is within 10 inches of the horizontal center plane of the bumper.

10. A bumper car as in claim 1, further comprising handgrips extending from the frame, one on the right side of the frame and one on the left side of the frame, the handgrips being adapted for bracing by the occupant.

* * * * *